United States Patent [19]

Tanita et al.

[11] Patent Number: 5,040,427

[45] Date of Patent: Aug. 20, 1991

[54] MOVING APPARATUS

[75] Inventors: Takeo Tanita, Kawasaki; Yusaku Azuma, Yokohama; Yasuhiro Sawada, Chufu, all of Japan

[73] Assignee: Canon Kabushiki Kaisha, Tokyo, Japan

[21] Appl. No.: 443,363

[22] Filed: Nov. 30, 1989

[30] Foreign Application Priority Data

Dec. 2, 1988 [JP] Japan ................................. 63-304042
Oct. 26, 1989 [JP] Japan ................................. 1-277258

[51] Int. Cl.⁵ ............................................... F16H 13/00
[52] U.S. Cl. .......................................... 74/209; 74/27; 74/208
[58] Field of Search ..................... 74/27, 206, 208, 209

[56] References Cited

U.S. PATENT DOCUMENTS 4,444,069 4/1984 Dangschat ............................ 74/209
4,909,093 3/1990 Mudford ............................... 74/209

FOREIGN PATENT DOCUMENTS 58-054948 12/1983 Japan .
61-117043 6/1986 Japan .
61-230835 10/1986 Japan .
63-132316 6/1988 Japan .
63-132317 6/1988 Japan .

*Primary Examiner*—Allan D. Herrmann
*Assistant Examiner*—David W. Laub
*Attorney, Agent, or Firm*—Fitzpatrick, Cella, Harper & Scinto

[57] ABSTRACT

A moving mechanism according to the present invention includes a fixed base, a moving member movably provided with respect to the fixed base, a driving motor mounted on the moving member, a driving shaft rotatably supported by the moving member and rotated by the driving motor, a pair of driven wheels to be brought into rolling contact with the driving shaft, a unit for simultaneously bringing the driven wheels into rolling contact with the base, and an abutting unit for causing the driving shaft to abut against the driven wheels so that they are frictionally engaged with each other, and causing the driven wheels to abut against the fixed base so that they are fictionally engaged with each other, wherein the driven wheels are rotated on the fixed base to move the moving member with respect to the fixed base in accordance with rotation of the driving shaft. The moving mechanism further includes a slip detecting unit for detecting slip generated in a driving power transmitting system from the driving shaft to the fixed base, an abuting force adjusting unit, connected to the abutting unit, for adjusting the abutting force of the abutting unit, and a slip control unit for adjusting the abutting force adjusting unit in a direction of eliminating the slip on the basis of the detection result of the slip detecting unit.

16 Claims, 10 Drawing Sheets

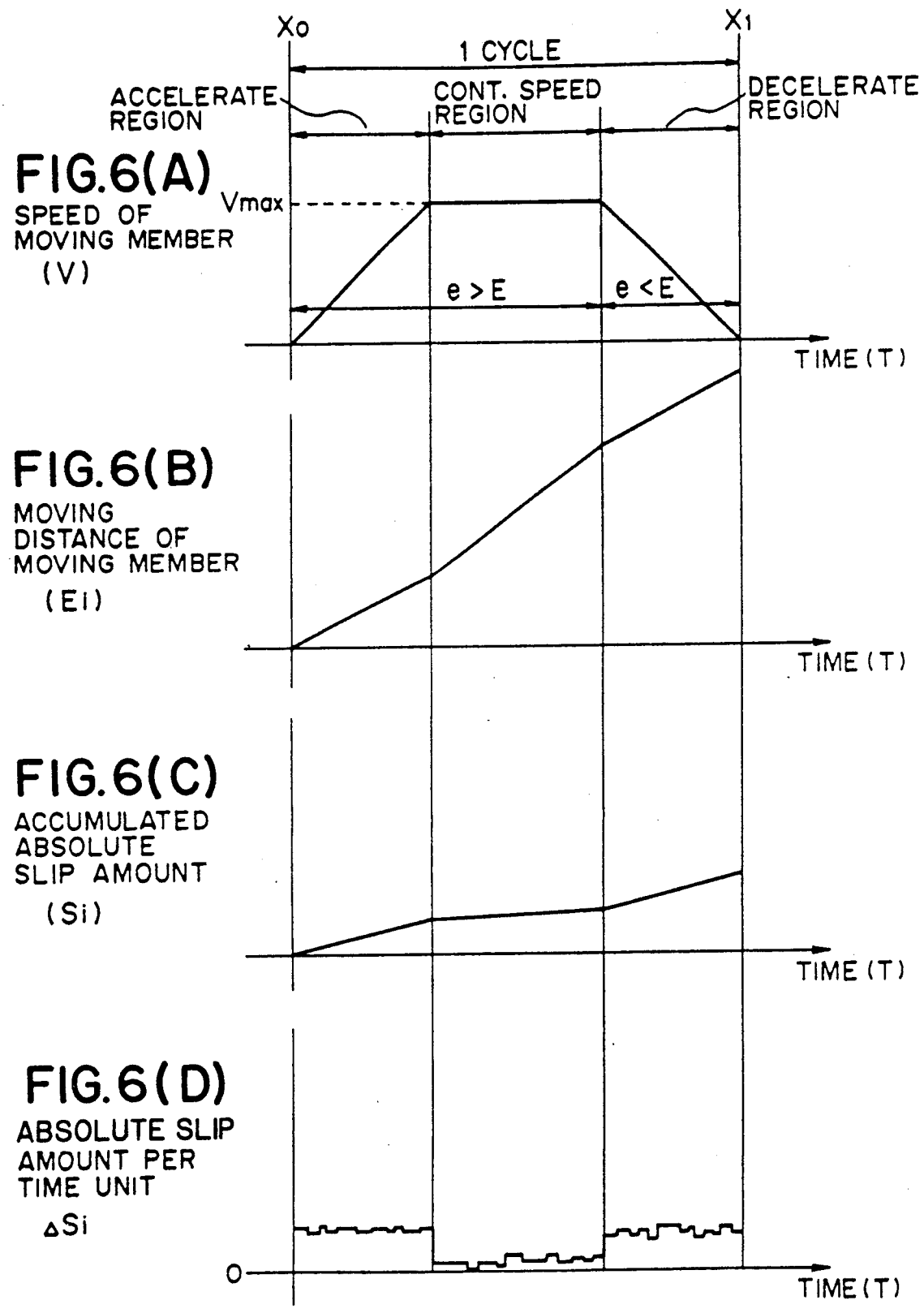

MOVING APPARATUS

BACKGROUND OF THE INVENTION

1. Field of the Invention

The present invention relates to a moving mechanism and, more particularly, to a moving mechanism optimal for a moving system for use in a shuttle and the like moving between industrial robots or NC machine tools and requiring a precise linear motion.

2. Related Background Art

Examples of a moving mechanism for use in machines of this type are a mechanism in which a rod member is sandwiched and moved by a combination of a plurality of friction rollers as disclosed in Japanese Patent Laid-Open No. 61-117043, and a mechanism in which a nut member threadably engaged with a ball bearing screw is mounted on a moving member side and the ball screw is rotated to move the moving body along the ball screw.

As a feed apparatus of a machine tool, apparatuses for friction-driving a moving body along a guide bar by using friction rollers are disclosed in Japanese Patent Publication No. 58-54948 and Japanese Patent Laid-Open No. 61-230835. In addition, a device according to the prior application of the present inventor is disclosed in Japanese Utility Model Application No. 62-113867.

Japanese Patent Laid-Open No. 63-132316 is a prior art reference concerning a countermeasure against sliding of a friction-driving apparatus. This patent specification discloses a friction-driving apparatus comprising a slider, a driving roller, abutting against the slider, for driving it by a friction, an adjusting mechanism for adjusting an abutting force between the slider and the driving roller, a speed detector for detecting a moving speed of the slider, a rotational speed detector for detecting a rotational speed of the driving roller, and a controller for arithmetically processing signals from the speed detector and the rotational speed detector, and controlling the adjusting mechanism on the basis of a difference signal.

Japanese Patent Laid-Open No. 63-132317 as a related patent application discloses a friction-driving apparatus comprising a slider, a driving roller, abutting against the slider, for driving it by a friction, an adjusting mechanism for adjusting an abutting force between the slider and the driving roller, a displacement detector for detecting a displacement of the slider, a rotational angle detector for detecting rotational angle of the driving roller, and a controller for arithmetically processing signals from the displacement detector and the rotational angle detector to calculate a displacement between the driving roller and the slider, and controlling the adjusting mechanism on the basis of a difference signal.

SUMMARY OF THE INVENTION

The above conventional apparatuses, however, have the following serious problem in order to perform a linear motion by utilizing friction. That is, in order to perform linear motion at high speed or to move a heavy object, the apparatus must be large in size. That is, since a high torque is required to move an object to be moved at high speed, a torque of a motor must be increased. In addition, in order to prevent slip, an abutting force must be increased. If, however, a surface pressure at a portion to be abutted is too high, plastic deformation is caused to disable the motion. Therefore, in order to reduce the surface pressure, the diameter of a driving shaft must be increased or a contact portion must be elongated. As a result, the apparatus is large in size.

The present invention has been made in consideration of the above situation, and has as its object to provide a moving mechanism capable of effectively suppressing slip in a driving force transmitting system using frictional engagement.

It is another object of the present invention to provide a moving mechanism capable of moving an object to be moved at high speed or moving a heavy object while maintaining high positioning precision without increasing the size of the apparatus but decreasing the size of the apparatus to be smaller than conventional apparatuses.

It is still another object of the present invention to provide a moving mechanism capable of increasing the service life of the apparatus while maintaining high positioning precision.

It it still another object of the present invention to provide a moving mechanism which can be easily assembled and adjusted and can be manufactured at low cost while maintaining high positioning precision.

In order to solve the above problems and achieve the above objects, a moving mechanism according to the present invention comprises a fixed base, a moving member movably provided with respect to the fixed base, a driving motor mounted on the moving member, a driving shaft rotatably supported by the moving member and rotated by the driving motor, a pair of driven wheels to be brought into rolling contact with the driving shaft, means for simultaneously bringing the driven wheels into rolling contact with the fixed base, and abutting means for causing the driving shaft to abut against the driven wheels so that they are frictionally engaged with each other, and causing the driven wheels to abut against the fixed base so that they are frictionally engaged with each other, wherein the driven wheels are rotated on the fixed base to move the moving member with respect to the fixed base in accordance with rotation of the driving shaft, the moving mechanism further comprising slip detecting means for detecting slip generated in a driving power transmitting system from the driving shaft to the fixed base, an abutting force adjusting means, connected to the abutting means, for adjusting the abutting force of the abutting means, and slip control means for adjusting the abutting force adjusting means in a direction of eliminating the slip on the basis of the detection result of the slip detecting means.

The moving mechanism according to the present invention is characterized in that the slip detecting means comprises first detecting means for detecting a theoretical moving amount, i.e., an amount by which the moving member theoretically moves on the basis of a rotation amount of the driving motor second detecting means for detecting an actual moving amount of the moving member, and calculating means for calculating a slip amount on the basis of a difference between the detection results of the first and second detecting means.

The moving mechanism according to the present invention is characterized in that the first detecting means detects a changing amount of the theoretical moving amount per time unit, the second detecting means detects a changing amount of the actual moving amount per time unit, and the calculating means calculates an absolute value of a difference between the changing amounts of the theoretical moving amount and the actual moving amount per time unit.

The moving mechanism according to the present invention is characterized in that the slip control means comprises recognizing means for recognizing whether a moving state of the moving member is any of three moving states, i.e., an accelerate region, a constant speed region, and a decelerate region, and first judging means for judging on the basis of a reference value corresponding to each moving state whether a slip amount per time unit calculated by the calculating means is abnormal.

The moving mechanism according to the present invention is characterized in that the slip control means comprises emergency relieving means for relieving an abnormal state when the first judging means judges the abnormal state.

The moving mechanism according to the present invention is characterized in that the slip control means controls the abutting force adjusting means in accordance with the slip amount per time unit calculated by the calculating means.

The moving mechanism according to the present invention is characterized in that the slip control means comprises an accumulating means for accumulating the slip amount per time unit to calculate an accumulated slip amount.

The moving mechanism according to the present invention is characterized in that the slip control means comprises second judging means for judging whether the accumulated slip amount accumulated by the accumulating means is abnormal.

The moving mechanism according to the present invention is characterized in that the slip control means further comprises emergency relieving means for relieving an abnormal state when the second judging means judges the emergency.

The moving mechanism according to the present invention is characterized in that the means for simultaneously bringing the driven wheels into contact with the fixed base comprises a driven housing for rotatably supporting the driven wheels separated from each other, and a driving housing, fitted from the above in the driven housing, for rotatably supporting the driving shaft.

The moving mechanism according to the present invention is characterized in that the abutting means comprises an abutting housing located above the driving housing and fixed to the moving member, a first coil spring housed in the abutting housing and abutting against the driven housing to urge it downward so that the driven wheels are frictionally engaged with the fixed base, and a second coil spring housed parallel to the first coil spring in the abutting housing and abutting against the driving housing to urge it downward so that the driving shaft is simultaneously frictionally engaged with the two driven wheels.

The moving mechanism according to the present invention is characterized in that a pair of guide rails are provided on the fixed base along a moving direction of the moving member, and sliding members are fitted in the guide rails so as to slide along the moving direction while the slide members are inhibited from being lifted therefrom, each sliding member being fixed to the moving member.

The moving mechanism according to the present invention is characterized in that the abutting force adjusting means comprises an oil pump, and oil cylinder means for applying an oil pressure from the oil pump in a direction opposite to a biasing direction of the first and second coil springs.

The moving mechanism according to the present invention is characterized in that the slip control means controls a driving amount of the oil pump to adjust the oil pressure therefrom, thereby controlling abutting forces of the two coil springs of the abutting means with respect to the driving housing and the driven housing.

The moving mechanism according to the present invention is characterized in that the oil cylinder means applies the oil pressure from the oil pump simultaneously to the first and second coil springs.

The moving mechanism according to the present invention is characterized in that the driving housing is fitted in the driven housing so as to lock movement along a direction perpendicular to the moving direction of the moving member.

The moving mechanism according to the present invention is characterized in that the abutting housing is fitted in the driven housing so as to lock movement along a direction perpendicular to the moving direction of the moving member.

The moving mechanism according to the present invention is characterized in that the diameter of the driving shaft is set smaller than the diameter of each driven wheel, and an angle 0 defined by normals at two rotation contact positions between the driving shaft and the two driven wheels is set to fall within the range of $60° < \theta < 180°$.

According to the moving mechanism of the present invention having the above arrangement, the slip control means controls the abutting force adjusting means to adjust the slip in the direction of eliminating the slip in accordance with the detection result obtained by the slip detecting means. Therefore, when frictional engagement is used in the driving force transmitting system, slip can be effectively suppressed.

BRIEF DESCRIPTION OF THE DRAWINGS

FIGS. 6A to 6D are timing charts for explaining a moving state of a moving member;

DETAILED DESCRIPTION OF THE PREFERRED EMBODIMENTS

An arrangement of an embodiment of a moving mechanism according to the present invention will be described below with reference to the accompanying drawings.

Figure 1:
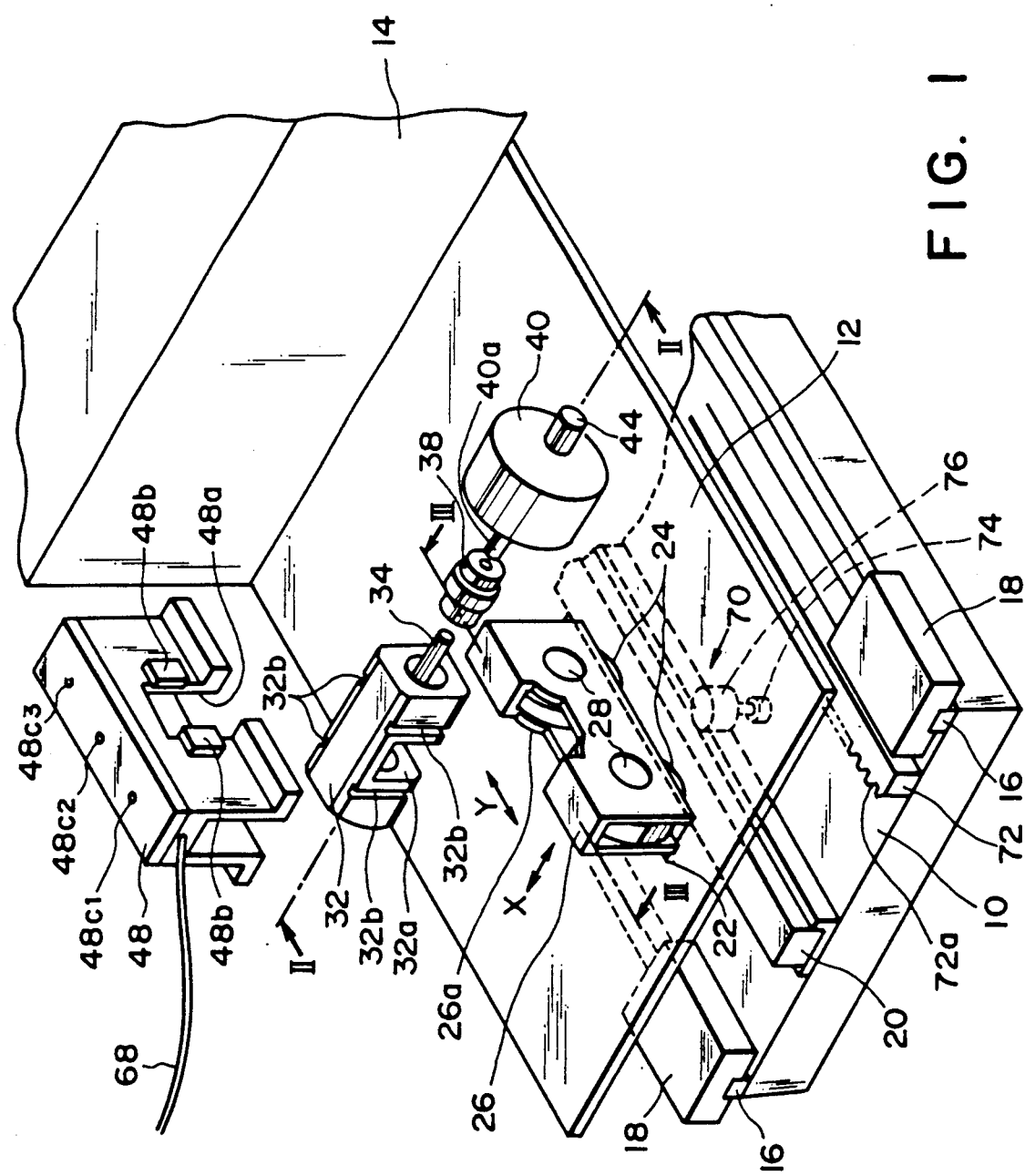
FIG. 1 is an exploded perspective view showing an arrangement of an embodiment of a moving mechanism according to the present invention.
Figure 2:
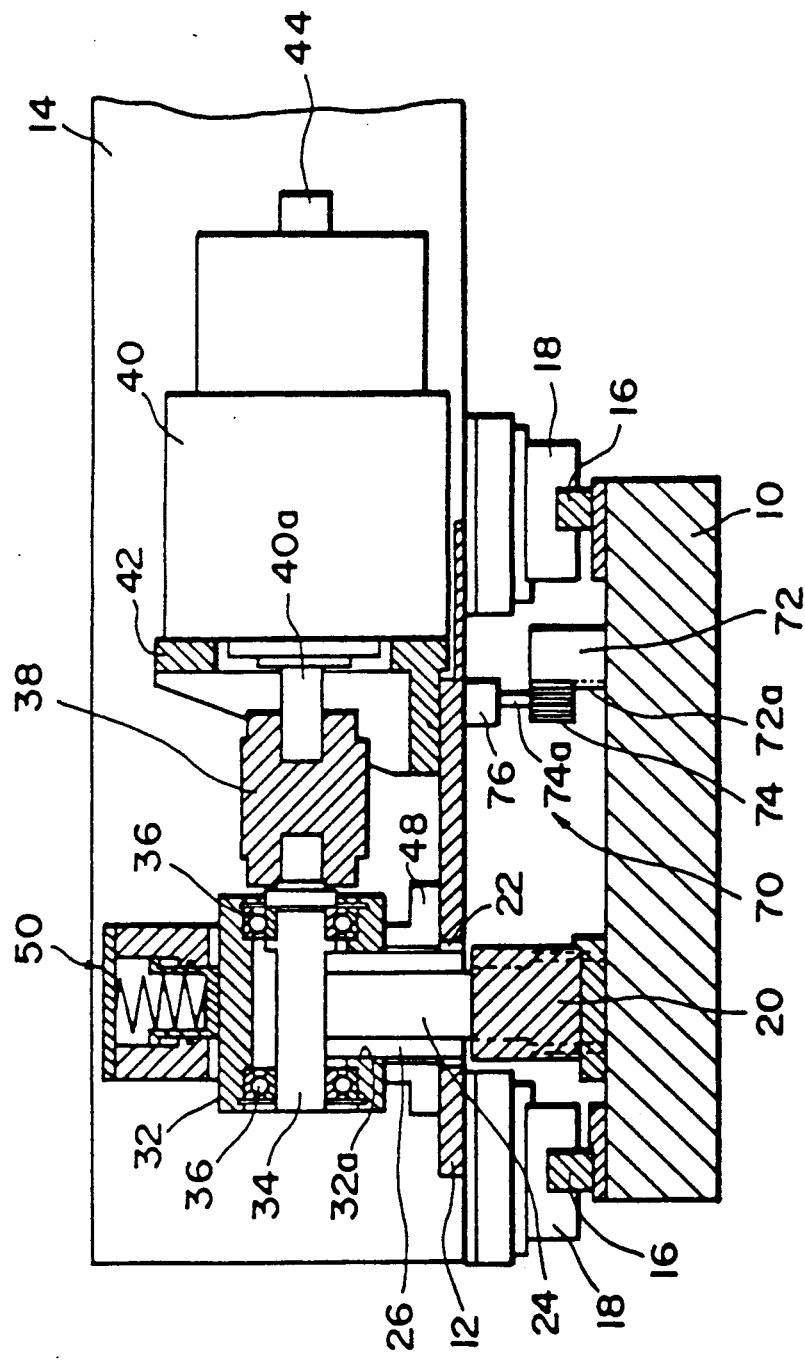
FIG. 2 is a longitudinal sectional view showing the moving mechanism along the line II—II in FIG. 1.
Figure 3:
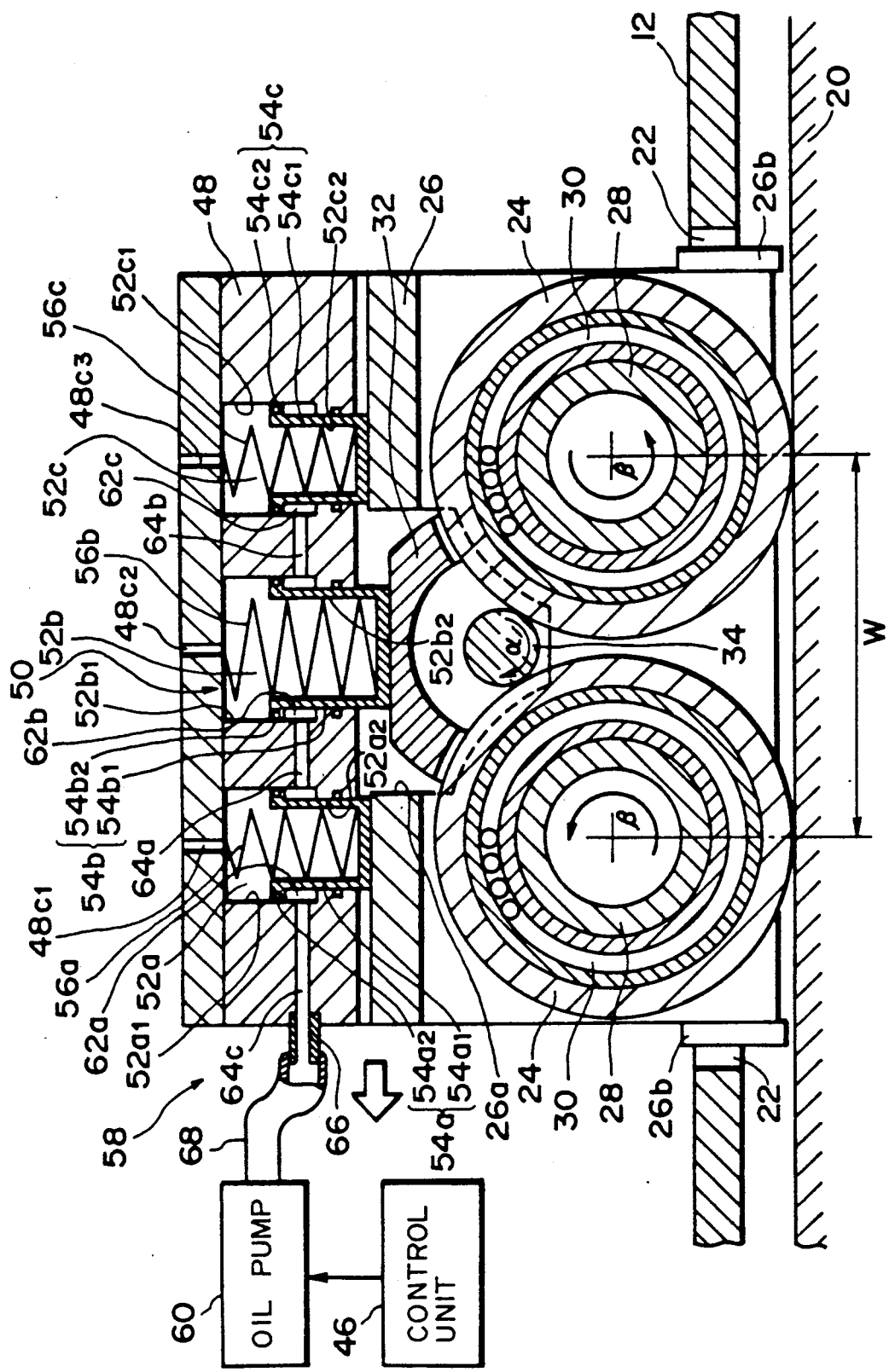
FIG. 3 is a longitudinal sectional view showing the moving mechanism along the line III—III in FIG. 1.

FIGS. 1 to 3 show a moving mechanism of a robot applying a moving mechanism of this embodiment.

Referring to FIG. 1, this moving mechanism comprises a fixed base 10 placed on a platen (not shown). A moving member 12 is located above the fixed base 10 so as to reciprocally, linearly move along a direction indicated by an arrow Y. A robot arm 14 is fixed at one end of the moving member 12 so as to move together with the moving member 12.

Guide rails 16 for guiding movement of the moving member 12 are fixed to two sides on the upper surface of the fixed base 10 and extend along the moving direction Y. At least two sliding members 18 are fitted on each guide rail 16 so as to slide along the moving direction Y. All the sliding members 18 are fixed on the lower surface of the moving member 12. Note that each sliding member 18 is fitted on the corresponding guide rail 16 so as not to be lifted from the guide rail 16 as shown in FIG. 2.

A guide bar 20 having a flat upper surface is fixed on the upper surface of the fixed base 10 at a position close to the guide rail 16 located deep in the drawing surface of FIG. 1. The guide bar 20 extends parallel to the guide rails 16, i.e., along the moving direction Y. An opening 22 is formed in the moving member 12 at a position from which the guide bar 20 can always be seen during movement along the moving direction Y. The opening 22 is elongated along the moving direction Y.

A pair of driven wheels 24 are provided through the opening 22. Lower end portions of the driven wheels 24 project below the moving member 12 and are brought into rolling contact with the upper surface of the guide bar 20 described above. The driven wheels 24 are adjacent to each other along the moving direction Y and pivotally supported via bearings 30 by support shafts 28 fixed to the driven wheel housing 26. The driven housing 26 is formed to have a U-shaped section with an open lower surface. A notch 26a for exposing upper portions of the outer circumferences of the driven wheels 24 is formed at the upper central portion.

As is apparent from FIG. 2, the driven housing 26 is loosely fitted in the opening 22 located a its lower end and can move vertically and horizontally. As shown in FIG. 3, wiper members 26b are mounted on both ends of front and rear portions of the driven housing 26. The wiper members 26b remove foreign matters from the guide bar 20 as the moving member 12 moves.

A driving housing 32 is fitted from the above in the driven housing 26. As shown in FIG. 1, the driving housing 32 extends along a horizontal direction indicated by an arrow X perpendicular to the moving direction Y. A recess 32a in which the driven housing 26 is fitted is formed in the lower surface central portion of the driving housing 32. The right and left side surfaces of the driven housing 26 abut against the right and left side surfaces of the recess 32a to define the position of the driven housing 26 in the X direction.

A driving shaft 34 extends through the driving housing 32 in the direction indicated by the arrow X and is pivotally supported about its central axis via bearings 36 provided at both end portions in the direction X of the driving shaft housing 32. The middle portion of the driving shaft 34 is exposed in the recess 32a and brought into rolling contact from the above with both the pair of driven wheels 24, as shown in FIG. 3. One end of the driving shaft 24 projects outward from the driving shaft housing 32. This projecting end is coupled to a motor shaft 40a of a driving motor 40 via a coupling member 38 so as to rotate integrally with the motor shaft 40a. As shown in FIG. 2, the driving motor 40 is fixed on the moving member 12 via a mounting bracket 42.

A pair of engagement grooves 32b are formed in each of front and rear surfaces of the driving shaft housing 32. The engagement grooves 32b are located at both sides of the recess 32a and vertically extend. A first rotary encoder 44 is mounted on the driving motor 40 to detect a rotation-driving amount of the motor. In order to achieve slip control to be described later, the first rotary encoder 44 is connected to a control unit 46 for controlling the overall moving mechanism.

An abutting housing 48 is fitted from the above in the driving shaft housing 32. The abutting housing 48 extends along the moving direction Y described above and has a substantially U-shaped section with an open lower surface. A notch 48a is formed in the lower surface at substantially the center of each of right and left side surfaces of the abutting housing 48. The upper portion of the driving shaft housing 32 is fitted in the notch 48a from the lower side. Locking pieces 48b are integrally mounted on each of the right and left side surfaces of the driving shaft housing 32 so as to project from front and rear portions of the corresponding notch 48a.

Each locking piece 48b is set to engage with the corresponding engagement groove 32b of the driving shaft housing 32. The front and rear end faces of the notch 48a of the abutting housing 48 abut against the front and rear surfaces of the driving shaft housing 32 fitted in the abutting housing 48, respectively. As a result, a position of the driving shaft housing in the Y direction is limited.

As shown in FIG. 2, the abutting housing 48 is fixed on the moving member 12. Therefore, a position of the driving shaft housing 32 in the X direction is limited via engagement of the engagement groove 32b with the locking piece 48b. That is, the positions of the driven housing 26 in the X and Y directions are defined via engagement of the driven housing 26 with the driving shaft housing 32 and rolling contact between the driving shaft 34 and the driven wheels 24.

In this embodiment, an abutting force generating mechanism 50 for generating an abutting force consisting of an oil pressure force is provided on the upper portion of the abutting housing 48 as shown in FIG. 3. The abutting force generating mechanism 50 includes three cylinder chambers 52a, 52b, and 52c open to the lower surface of the abutting housing 48. The chambers 52a, 52b, and 52c are arranged at predetermined intervals in the moving direction Y. The left and right cylinders 52a and 52c are arranged at positions facing the upper surface of the driven housing 26, and the central cylinder 52b is arranged at a position facing the upper surface of the driving shaft housing 32.

The cylinder chambers 52a, 52b, and 52c are constituted by large-diameter portions $52a_1$, $52b_1$, and $52c_1$ located at the upper portions and small-diameter portions $52a_2$, $52b_2$, and $52c_2$ connected to the lower portions of the large-diameter portions, respectively. The lower portions of the small-diameter portions $52a_2$, $52b_2$, and $52c_2$ are open to the lower surface of the abutting housing 48. Pistons $54a$, $54b$, and $54c$ as urging members are inserted in the cylinder chambers $52a$, $52b$, and $52c$, respectively, so as to project downward.

The pistons $54a$, $54b$, and $54c$ are integrally constituted by: cylindrical piston main bodies $54a_1$, $54b_1$, and $54c_1$ having outer circumferential surfaces to be brought into slidable contact with the inner circumferential surfaces of the large-diameter portions $52a_2$, $52b_2$, and $52c_2$ of the corresponding cylinder chambers $52a$, $52b$, and $52c$, respectively, open upper surfaces, and closed lower surfaces; and outer flanges $54a_2$, $54b_2$, and $54c_2$ integrally formed with the upper ends of the corresponding piston main bodies $54a_1$, $54b_1$, and $54c_1$ and having outer circumferential surfaces to be brought into slidable contact with the inner surfaces of the large-diameter portions $52a_1$, $52b_2$, and $52c_2$, respectively.

Coil springs $56a$, $56b$, and $56c$ for biasing the corresponding pistons $54a$, $54b$, and $54c$ downward are housed in the cylinder chambers $52a$, $52b$, and $52c$, respectively. The upper ends of the coil springs $56a$, $56b$, and $56c$ are fixed to the ceiling surfaces of the cylinder chambers $52a$, $52b$, and $52c$, and their lower ends are locked on the bottom portion upper surfaces of the pistons $54a$, $54b$, and $54c$, respectively.

That is, basically, the driven housing 26 is biased downward by biasing forces of the coil springs $56a$ and $56c$ via the pistons $54a$ and $54c$ located at both sides, and the driving shaft housing 32 is biased downward by a biasing force of the coil spring $56b$ via the piston $54b$ located at its center.

Communication holes $48c_1$, $48c_2$, and $48c_3$ for causing the cylinder chambers $52a$, $52b$ and $52c$ to communicate with an outer atmosphere are formed in the upper portion of the abutting housing 48 so that the pressures in the cylinder chambers $52a$, $52b$, and $52c$ do not change in accordance with vertical motions of the pistons $54a$, $54b$, and $54c$, respectively.

An abutting force adjusting mechanism 58 is connected to the abutting force generating mechanism 50. As will be described later, if slip occurs in the driving force transmitting system, wear of the driving shaft 34 must be prevented to prolong the service life of the apparatus as a whole. For this purpose, the abutting force adjusting mechanism 58 adjusts the abutting force generated by the abutting force generating mechanism 50 in a direction of eliminating the slip. As shown in FIG. 3, the abutting force adjusting mechanism 58 causes the oil pressure to act against the biasing forces of the coil springs $56a$, $56b$, and $56c$, and adjusts an output from an oil pump 60 for generating the oil pressure, thereby arbitrarily adjusting the abutting forces acting on the driven housing 26 and driving shaft housing 32.

The abutting force adjusting mechanism 58 includes ring-like oil cylinder chambers $62a$, $62b$, and $62c$ defined between the outer flanges $54a_2$, $54b_2$, and $54c_2$ and step portions of the corresponding cylinder chambers $52a$, $52b$, and $52c$, respectively. Adjacent ones of the oil cylinder chambers $62a$, $62b$, and $62c$ are connected to communicate with each other via first and second communication paths $64a$ and $64b$. The oil cylinder chamber $62a$ at the left side in FIG. 3 is caused to communicate via a third communication path $64c$ with a connection port 66 mounted on the side surface of the abutting housing 48.

The connection port 66 is connected to the oil pump 60 via a connection tube 68. In the oil pump 60, the output value of oil pressure is adjusted to be a desired value in accordance with a rotational speed of an oil motor (not shown). In this manner, the oil pressure from the oil pump 60 simultaneously acts on the three oil cylinder chambers $62a$, $62b$, and $62c$ communicating with each other.

The abutting forces generated by the pair of coil springs $56a$ and $56c$ of the abutting force generating mechanism 50 are transmitted to the two driven wheels 24 after the oil pressure supplied from the abutting force adjusting mechanism 58 is reduced therefrom. The abutting force generated by the coil spring $56b$ is transmitted to the driving shaft 34 after the oil pressure from the abutting force adjusting mechanism 58 is reduced therefrom. As a result, as described in detail below, in addition to the biasing forces of the pair of coil springs $56a$ and $56c$ acting on the driven wheels, the biasing force of the coil spring $56b$ acting on the driving shaft 34 independently acts on the driven wheels 24 as well. Therefore, the abutting force generated by the abutting force generating mechanism 50 is efficiently transmitted to the guide bar 20 via the two driven wheels 24.

In the driven wheel housing 26, if only an intershaft distance W (shown in FIG. 3) between the pair of driven wheels 24 is precisely set, run positioning precision of the moving member 12 is not adversely affected, even if other values are not precisely set. As a result, a manufacturing cost can be effectively reduced. In addition, since a positional relationship between the driving shaft 34 and the two driven wheels 24 is determined by only applying the force on the driving shaft housing 32 by the abutting force generating mechanism 50, assembly can be very simply performed.

In this embodiment, an oil pressure is utilized as a pressure source of the abutting force adjusting mechanism 58. In the abutting force generating mechanism 50, the biasing forces of the coil springs $56a$, $56b$, and $56c$ are used as its main abutting force, and the oil pressure from the abutting force adjusting mechanism acts to reduce these biasing forces. As a result, even if the abutting force adjusting mechanism 58 malfunctions and no oil pressure acts, only the oil pressure in the direction of reducing the biasing forces of the coil springs $56a$, $56b$, and $56c$ disappears in the abutting force generating mechanism 50. Therefore, the abutting force generated by the abutting force generating mechanism 59 is not basically reduced. On the contrary, the malfunction of the abutting force adjusting mechanism 58 acts in a direction of increasing the abutting force generated by the abutting force generating mechanism 50. Therefore, a slip state is changed in a direction of making it more difficult to cause slip, thereby realizing an optimum fail-safe form.

As shown in FIG. 1, an actual moving amount detecting mechanism 70 is provided to detect an actual moving amount of the moving member 12. The actual moving amount detecting mechanism 70 comprises: a rack member 72 mounted on the upper surface of the fixed base 10 to extend in the moving direction Y at a position close to the guide rail 16 at this side of FIG. 1; a pinion gear 74 meshed with a rack gear $72a$ formed on the side surface of the rack member 72 and rotatably supported about a vertical axis; and a second encoder 76, fixed on the lower surface of the moving member 12 and coupled to a shaft portion $74a$ of the pinion gear 74, for detecting a rotation-driving amount of the pinion gear 74.

In order to obtain correct positioning precision of the moving member 12, the second rotary encoder 76 is connected to the control unit 46 described above to control the driving motor 40. An output result from the second rotary encoder 76 is used as basic data for performing the above slip control in the control unit 46.

A main movement control sequence of the control unit 46 of the moving mechanism according to the embodiment having the above arrangement will be described below with reference to a flow chart shown in FIG. 4.

As shown in step S10, when start of the moving mechanism is commanded in accordance with the control program of a robot (not shown), a stop position $P_1$ and a target position $P_2$ of the moving member 12 are read in step S12. In step S14, a moving distance D between the stop position $P_1$ and the target position $P_2$ is calculated. In step S16, a moving pulse count $P_C$ of the second rotary encoder 76 corresponding to the moving distance is calculated. In step S18, a current output value from the second rotary encoder 76, i.e., a detection value $P_D$ of the second rotary encoder 76 is reset. Thereafter, in step S20, a start signal is output to the driving motor 40. While the start signal is output, the driving motor 40 rotates the motor shaft 40a in the forward direction (clockwise as indicated by reference symbol $\alpha$) as shown in FIG. 3.

In step S22, the detection value $P_D$ of the second rotary encoder 76 is compared with the moving pulse count $P_C$, thereby checking whether the detection value $P_D$ is smaller than the moving pulse count $P_C$. If Y (YES) is judged in step S22, i.e., if it is judged that the detection value $P_D$ is smaller than the moving pulse count $P_C$ and the moving member 12 has not reached the target position $P_2$ yet, step S20 described above is executed to continuously drive the driving motor 40.

If N (NO) is judged in step S22, the detection value $P_D$ is equal to or larger than the moving pulse count $P_C$. Therefore, in subsequent step S24, it is judged whether the detection value $P_D$ is equal to the moving pulse count $P_C$. If Y in step S24, i.e., if the detection value $P_C$ is equal to the moving pulse count $P_C$, it is judged that the moving member 12 has reached the target position $P_2$. Therefore, driving of the driving motor 40 is stopped in step S26, and a signal indicating that the target position $P_2$ is reached is output in step S28, thereby ending the control operation.

If N is judged in step S24, i.e., if the detection value $P_D$ is larger than the moving pulse count $P_C$, the moving member 12 passes the target position $P_2$. Therefore, the driving motor 40 is rotated in the backward direction (counterclockwise) in step S30, and the flow returns to and executes step S22.

In this manner, the control unit 46 controls the driving motor 40 on the basis of the detection result of the second rotary encoder 76. Therefore, even if slip occurs in the driving force transmitting system, the moving member 12 is correctly moved from the stop position $P_1$ to the target position $P_2$. Note that the control unit 46 specifically defines lengths of the speed pattern of the rotational speeds, i.e., the accelerate, constant speed, and decelerate regions of the driving motor 40 in accordance with the moving distance D.

As described above with reference to step S20, when the driving motor 40 rotates the motor shaft 40a clockwise as indicated by reference symbol $\alpha$ under the control of the control unit 46, the driving shaft 34 coupled to the motor shaft 40a via the coupling member 38 is rotated in the $\alpha$ direction.

In this case, the abutting force is generated by the abutting force generating mechanism 50 so as not to cause slip between the driving shaft 34 and the two driven wheels 24. That is, assuming that the biasing forces of the first to third coil springs 56a, 56b, and 56c are Pa, Pb, and Pc, respectively, and the biasing force applied from the oil pump 60 to the first to third oil cylinder chambers 62a, 62b, and 62c is Pc, an abutting force $P_N$ acting on the driving shaft 34 is (Pa−Pc) and an abutting force $P_S$ acting on the right and left driven wheels 24 is (Pb−Pc). The abutting forces $P_N$ and $P_S$ are set such that no slip is produced between the driving shaft 34 and the two driven wheels 24 and between the two driven wheels 34 and the guide bar 20 and no plastic deformation occurs in the abutted portion.

That is, the rotational force of the driving shaft 34 is transmitted as a counterclockwise force ($\beta$ direction) to each of the two driven wheels 24. In addition to the biasing force $P_S$ from the abutting force generating mechanism 50, a vertical component force $P_V$ of the biasing force $P_N$ acting on the driving shaft 34 acts on the two driven wheels 24. As a result, each driven wheel 24 is abutted against the guide bar 20 by an abutting force $P_R(=P_S+P_V)$ and brought into rolling contact therewith. Each driven wheel 24 rotates on the guide bar 20 without slip and the moving member 12 moves in the Y direction, provided that a torque transmitted from the driving shaft 34 to each driven wheel 24 at a rolling contact point A is directly transmitted at a rolling contact point B between each driven wheel 24 and the guide bar 20. In this case, in order to satisfy the above torque transmission conditions, assuming that an angle defined between normals from the driving shaft 34 to the two driven wheels 24 at the rolling contact points A is 120°, $$P_R \geqq P_N$$

must be satisfied. That is, since $P_R = P_S + P_V$ as described above, $$P_S + P_V \geqq P_N$$

is obtained. Therefore, in order to protect the driven wheels 24 from slipping against the guide bar 20, the abutting force $P_S$ represented by $$P_S \geqq P_N - P_V$$

must be generated by the abutting force generating mechanism 50.

Figure 5B:
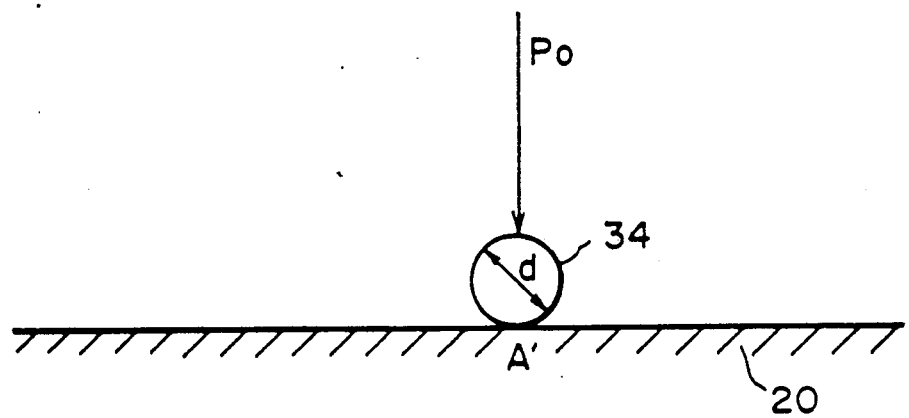
FIGS. 5A and 5B are views for explaining force balances in a conventional apparatus and the present invention.
Figure 5A:
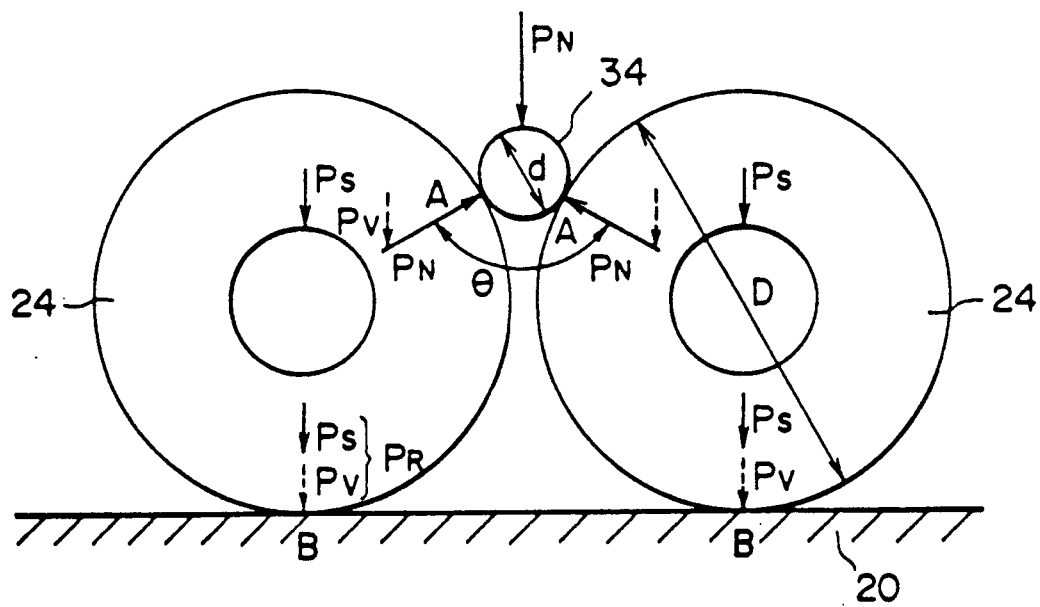

An embodiment shown in FIG. 5A will be compared with a conventional apparatus shown in FIG. 5B in which an abutting force $P_O$ is applied to the driving shaft 34 having a diameter d (=25 mm) so that the driving shaft 34 is directly brought into rolling contact with the guide bar 20 and moved.

In the conventional apparatus, a force balance is maintained because the abutting force $P_O$ directly acts on a rolling contact point A' of the driving shaft 34 with respect to the guide bar 20.

In this embodiment as shown in FIG. 5A, however, assuming that an angle $\theta$ defined between normals from the driving shaft 34 having a diameter d (=25 mm) to the two driven wheels 24 having a diameter D (=360 mm) at the rolling contact points A is 120°, the torque transmitted from the driving shaft 34 to the driven wheels 24 is divided into two components. Therefore, the abutting force $P_N$ of the driving shaft 34 required to transmit the torque equal to the conventional torque with respect to each driven wheel 24 need only be half the abutting force $P_O$ in the conventional apparatus.

If, however, only the vertical component force $P_V$ of $P_N$ acts as the abutting force $P_R$ acting on the rolling contact point B of each driven wheel 24 with respect to the guide bar 20, the abutting force is insufficient as compared with the transmission torque at the rolling contact point B. In this embodiment, however, the abutting force $P_S$ of the abutting force generating mechanism 50 auxiliarily acts on both the driven wheels 24. Therefore, the moving member 12 can move while the driven wheels 24 are brought into rolling contact with the guide bar 20 without slip.

Surface pressures acting on the rolling contact points A, A', and B were calculated by a logic equation of HERTZ assuming that the width of the rolling contact point is l (=35 mm). As a result, the surface pressures at the rolling contact points A and B were reduced by 21% and 67%, respectively, than that at the rolling contact point A' in the conventional apparatus.

This means that if the transmission torque remains the same, a service life can be prolonged as the surface pressure is reduced, and that if the service life remains the same, a larger torque can be transmitted. Note that every member is abutted, no play is produced.

Figure 4:
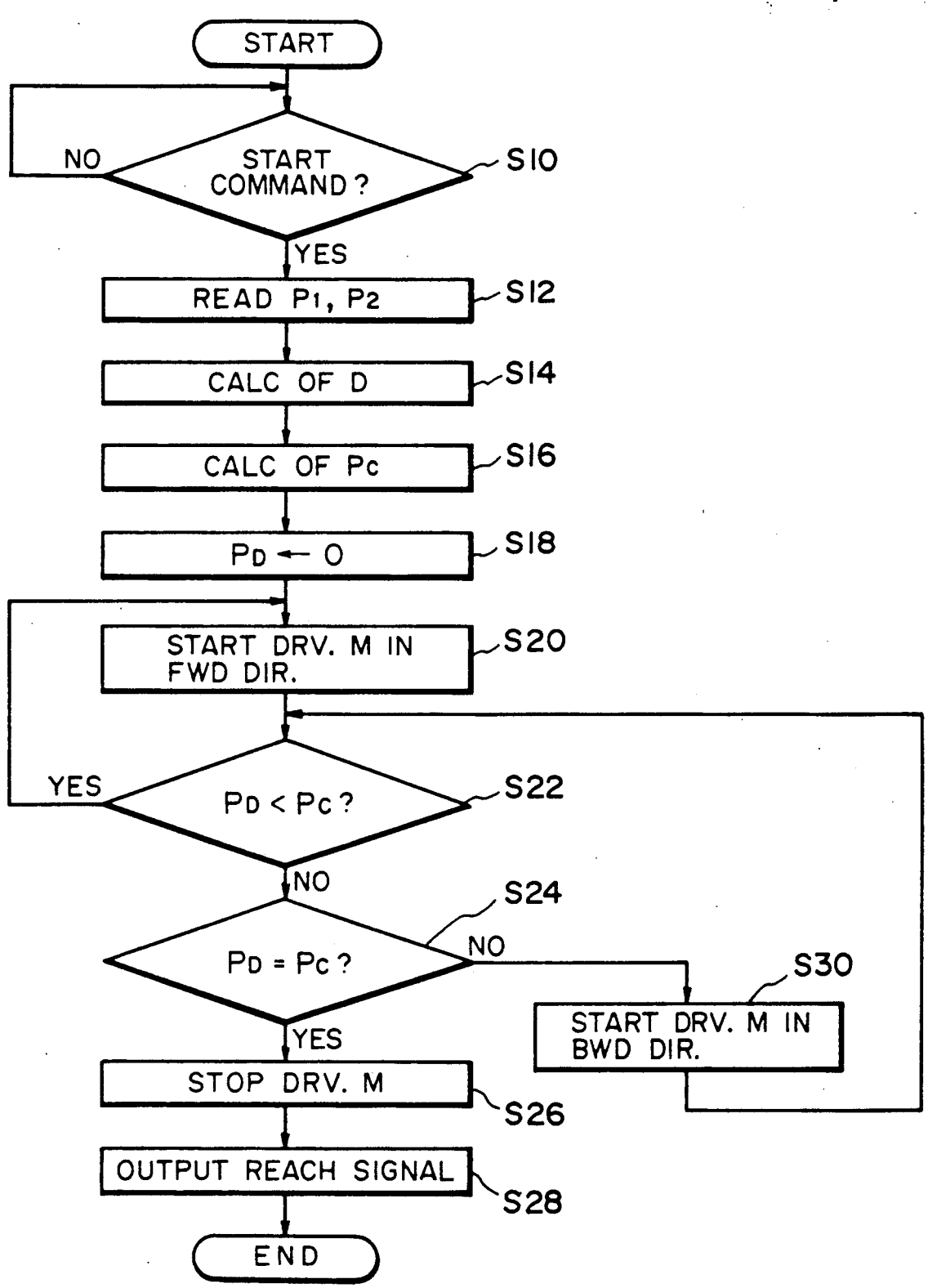
FIG. 4 is a flow chart showing a basic control sequence in a control unit for controlling a driving motor in order to move a moving member.

In this manner, in order to move the robot arm 14 in the direction indicated by arrow X in accordance with the control program of the robot (not shown), the driving motor 40 is driven to bring the driving shaft 34 and the two driven wheels 24 into rolling contact with each other, and the moving member 12 can be moved along the moving direction Y while the driven wheels 24 are brought into rolling contact with the guide bar 20 without causing slip in the driving force transmitting system, in accordance with the control sequence shown in FIG. 4.

As described above, the state in which no slip occurs is achieved. After a long-time operation, however, the surface of a member at the rolling contact portion is degraded or worn, or the frictional coefficient described above slightly changes as the humidity or temperature in an atmosphere in which the moving mechanism is placed changes, thereby causing slip.

In this embodiment, therefore, the control unit 46 firstly controls, on the basis of a slip amount change per time unit, the abutting force adjusting mechanism 58 to adjust the abutting force of the abutting force generating mechanism 50 in the direction not producing the slip. Secondly, if an accumulated value of the slip amount exceeds a certain reference, the control unit 46 generates an alarm to an operator to perform an emergency relief operation such as replacement of the driving shaft 34 or the driven wheels 24 because it becomes difficult to perform positioning control with high precision.

Slip suppressing control of the control unit 46 will be described below. Firstly, a moving state of the moving member 12 will be described in detail below with reference to FIG. 6. Secondly, the contents of slip suppressing control of the control unit 46 will be generally described below with reference to a functional block diagram shown in FIG. 7.

Assume that the moving member 12 moves from the stop position $P_1$ to the target position $P_2$ in accordance with the control sequence shown in FIG. 4. As shown in FIG. 6A, the moving speed V of the moving member 12 is gradually increased from "0" to a maximum speed Vmax (this period is called an "accelerate region"). Thereafter, the maximum speed Vmax is maintained for a certain time interval (this period is called a "constant speed region"). The speed is then gradually reduced to "0" (this period is called a "decelerate region"). An actual moving distance $E_i$ of the moving member 12 is calculated by an actual moving distance calculating block 46a shown in FIG. 7 on the basis of the detection output from the second rotary encoder 76. The calculation result appears as shown in FIG. 6B. In this case, the driving torque of the driving motor 40 reaches its peak in the accelerate and decelerate regions in accordance with the well-known law of inertia. At this time, if a sufficient abutting force acts between the driving shaft 34 and the two driven wheels 24 and between the driven wheels 24 and the guide bar 20, both the members do not slip by the frictional force. If, however, only an insufficient abutting force can be obtained because the friction coefficient changes as described above, slip occurs between both the members.

A distance $e_i$ along which the moving member 12 logically moves upon rotation of the driving shaft 34 is defined as follows by a logical moving distance calculating block 46b shown in FIG. 7:

$$e_i = D \times \pi \times N$$

where
D: the diameter of the driving shaft 34
$\pi$: the ratio of the circumference of a circle to its diameter
N: the rotational speed of the driving shaft 34 on the basis of the detection output from the first rotary encoder 44

Note that in the accelerate region, the logical moving distance $e_i$ is larger than the actual moving distance $E_i$ and a difference between the two distances corresponds to the slip amount (this slip is positive). In the constant speed region, this tendency similarly appears although it is not so conspicuous. In the decelerate region, however, the actual moving distance $E_i$ is larger than the logical moving distance $e_i$ (this slip is negative). Therefore, since positive and negative slip amounts are present, slip cannot be correctly evaluated only by comparing the logical moving distance $e_i$ and the actual moving distance $E_i$ at the moving end point $P_1$.

For this reason, a moving time $T_O$ corresponding to one cycle from the moving start point (stop position) $P_1$ to the end point (target position) $P_2$ is equally divided to obtain a time unit, and an absolute value of a slip amount between the driving shaft 34 and the guide bar 20 per time unit ($\Delta t$) and an accumulated amount of this absolute value are detected.

Figure 7:
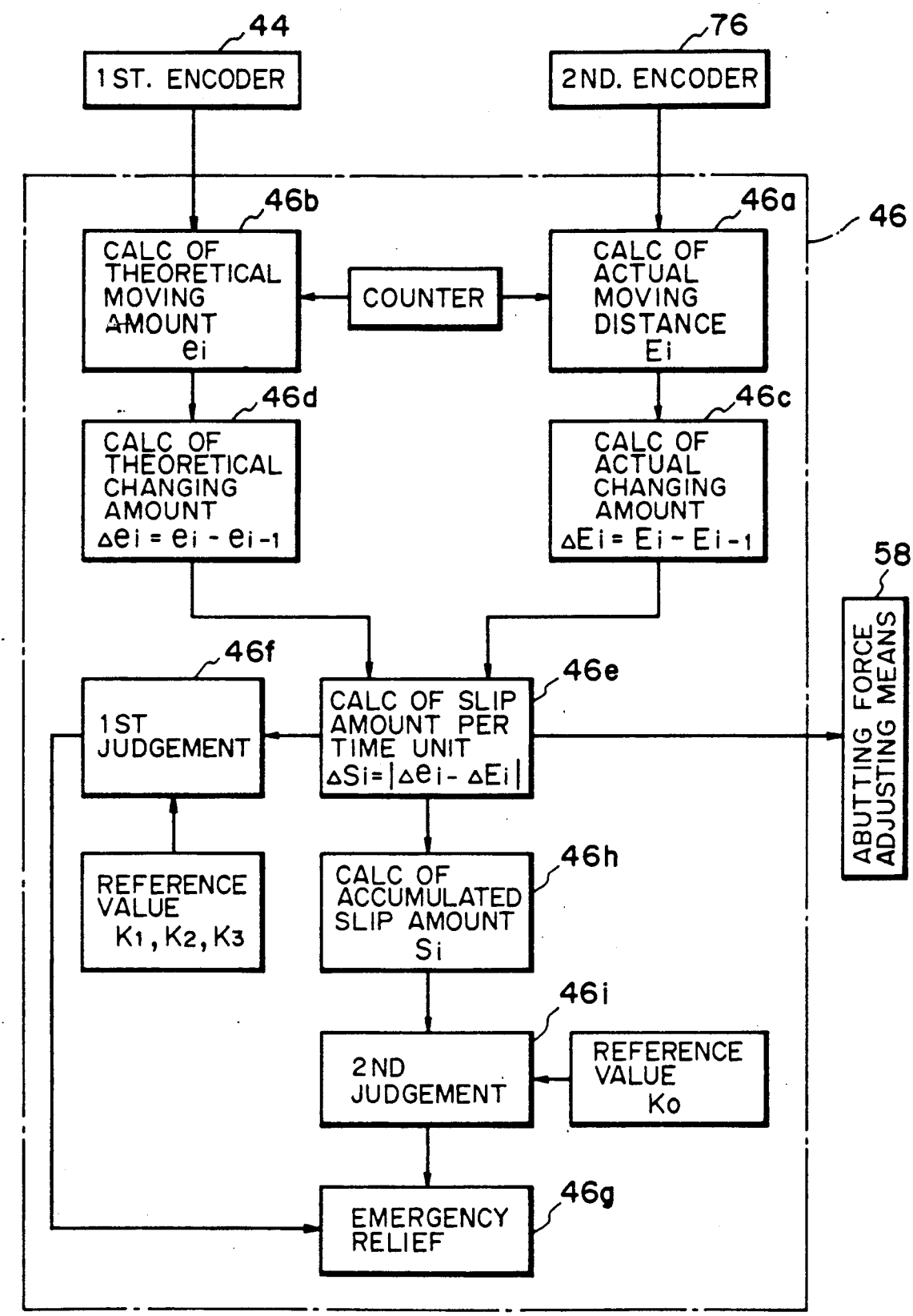
FIG. 7 is a functional block diagram of the control unit.

That is, as shown in FIG. 7, an actual moving distance $\Delta E_i$ per time unit is defined as a value obtained by subtracting an actual moving distance $E_{i-1}$ calculated at an immediately preceding calculation timing from an actual moving distance $E_i$ calculated at a current calculation timing by an actual changing amount calculating block 46c. A theoretical moving distance $\Delta e_i$ per time unit is defined as a value obtained by subtracting a theoretical moving distance $e_{i-1}$ calculated at an immediately preceding calculation timing from a theoretical moving distance $e_i$ calculated at a current calculation timing by a theoretical changing amount calculating block 46d.

Figure 8:
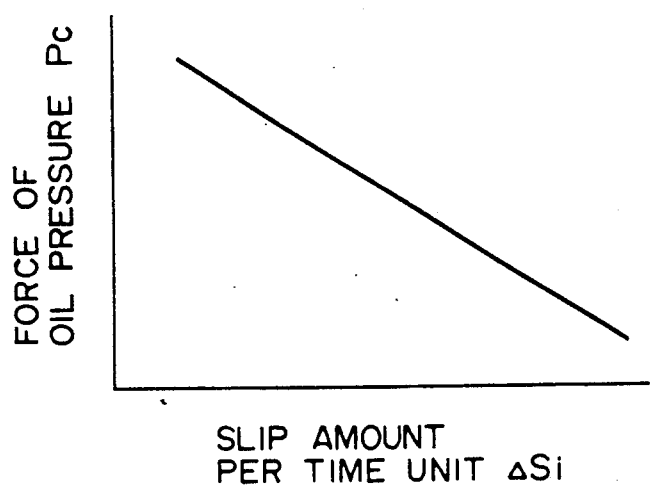
FIG. 8 is a graph showing a relationship between a slip amount per time unit and a force of oil pressure.
Figure 9:
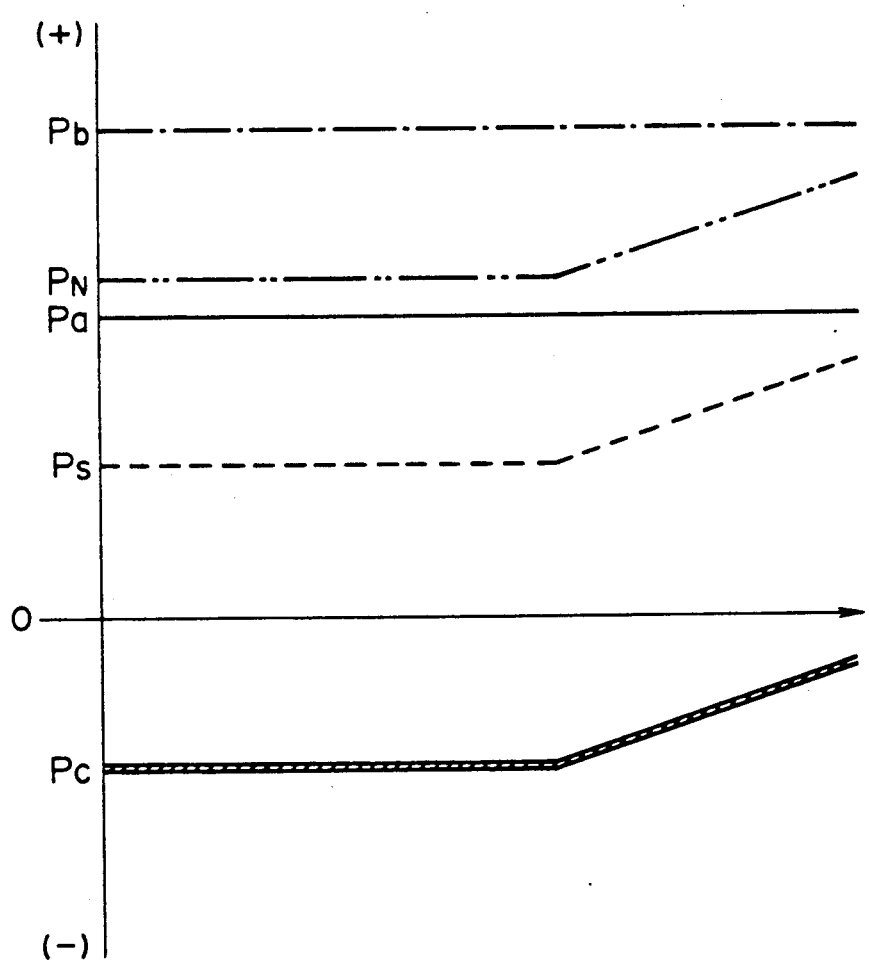
FIG. 9 is a graph showing a state in which an abutting force output from a abutting force generating mechanism is adjusted by an abutting force adjusting mechanism.

A slip amount calculating block 46e executes an arithmetic operation for obtaining an absolute value of a difference between a calculation result $\Delta c_i$ obtained by the actual changing amount calculating block 46c and a calculation result $\Delta E_i$ obtained by the theoretical changing amount calculating block 46d, thereby calculating a slip amount $\Delta S_i$ per time unit. In this case, the slip amount $\Delta S_i$ per time unit appears as shown in FIG. 6D. In accordance with this slip amount $\Delta S_i$ per time unit, the control unit 46 changes the output value from the abutting force adjusting mechanism 58, i.e., the value of the biasing force $P_c$ applied from the oil pump 60 to the oil cylinders 62a, 62b, and 62c in a direction of increasing a slip as the oil pressure increases, on the basis of a relationship shown in FIG. 8. On the basis of this change in biasing force $P_c$, the abutting force output from the abutting force generating mechanism 50 is adjusted and changed as shown in FIG. 9 and controlled in a direction of reducing slip.

The slip amount $\Delta S_i$ per time unit calculated by the slip amount calculating block 46e is compared with a predetermined reference value at each calculation timing. If the slip amount $\Delta S_i$ per time unit is larger than the corresponding reference value, the slip state is emergent and this emergency must be relieved. Therefore, an emergency relief block 46g executes an emergency relief operation of, e.g., emergently stopping the moving mechanism and generating an alarm. More specifically, three types of reference values $k_1$, $k_2$, and $k_3$ are set in accordance with the accelerate, constant speed, and decelerate regions. Of the three reference values, the reference value $k_2$ is smallest. In accordance with whether acceleration or deceleration is set strongly in a speed pattern, one of the reference values $k_1$ and $k_3$ of a set region is set larger than the other.

That is, in the constant speed region, slip hardly occurs since no acceleration is generated. If, however, slip occurs to a certain extent even in this state, this can be judged as an emergency. Therefore, the reference value $k_2$ is set smaller than that in the accelerate or decelerate region in which plus or minus acceleration is generated to easily cause slip. When a first judgement block 46f judges that the slip amount per time unit exceeds this smaller reference value $k_2$, it immediately executes emergency judgement.

One of (acceleration of) the accelerate and decelerate regions to be set strongly is arbitrarily defined in setting the speed pattern. In either case, slip occurs more easily in a region having larger acceleration. Therefore, by setting the reference value of an operation region in which slip occurs more easily to be larger than the other, emergency judgement is prevented from being frequently generated when no emergency is present. If excessive slip occurs per time unit in such a state in which slip easily occurs, this must be judged as an emergency. Therefore, the reference values $k_1$ and $k_3$ are defined to be larger than the reference value $k_2$ in the constant speed region.

An accumulate slip amount calculating block 46h accumulates an absolute value of the slip amount $\Delta S_1$ per time unit calculated by the slip amount calculating block 46c to calculate an accumulated slip amount $S_i$. This accumulated slip amount $S_i$ appears as shown in FIG. 6C. A second judgement block 46i compares the accumulated slip amount $S_i$ calculated by the slip amount calculating block 46h with the reference value $k_0$. If slip occurs so continuously that the accumulated slip amount $S_i$ exceeds the reference value $k_0$, the second judgement block 46i judges an emergency, and executes the emergency relief operation in the emergency relief block 46g.

That is, as described above, this emergency judgement is basically executed when slip continuously occurs although the abutting force of the abutting force generating mechanism 40 is increased by the abutting force adjusting mechanism 38 on the basis of the slip amount $\Delta S_1$ per time unit and controlled in the direction of reducing a slip. More specifically, an emergency is judged when, e.g., an oil variation range of the abutting force adjusting mechanism 58 reaches its limit to disable oil adjustment, or an oil is accidentally applied to the guide bar 20 to largely decrease the frictional coefficient and a slip cannot be prevented by only adjusting the abutting force. In order to cope with these cases, the emergency judgement is executed on the basis of the accumulated slip amount $S_i$.

In this case, the emergency judgement reference value $k_0$ is defined on the basis of a relationship with respect to a slip ratio representing a ratio of the accumulated slip amount $S_i$ produced per running distance unit (e.g., 100 mm). The reference value $k_0$ is defined such that the emergency judgement is executed when the slip ratio exceeds 0.5%. That is, when slip occurs at a value higher than a predetermined slip ratio, it becomes difficult to perform feed-back control for positioning the moving member 12. More specifically, when the slip ratio is high, high stop position precision with respect to the target position $P_2$ is maintained because the position control is executed on the basis of the second rotary encoder 76. Since, however, a control time of the position control is prolonged, a tact time is increased. In addition, the driving shaft 34 is worn to reduce its diameter on the basis of the slip and therefore to reduce the maximum speed $V_{MAX}$ of the moving speed 12, thereby increasing the tact time. Therefore, in this embodiment, the reference value $k_0$ is defined in view of this. If the accumulated slip amount $S_i$ exceeding the reference value $k_0$ is detected, an emergency is judged to execute the emergency relief.

Figure 10A:
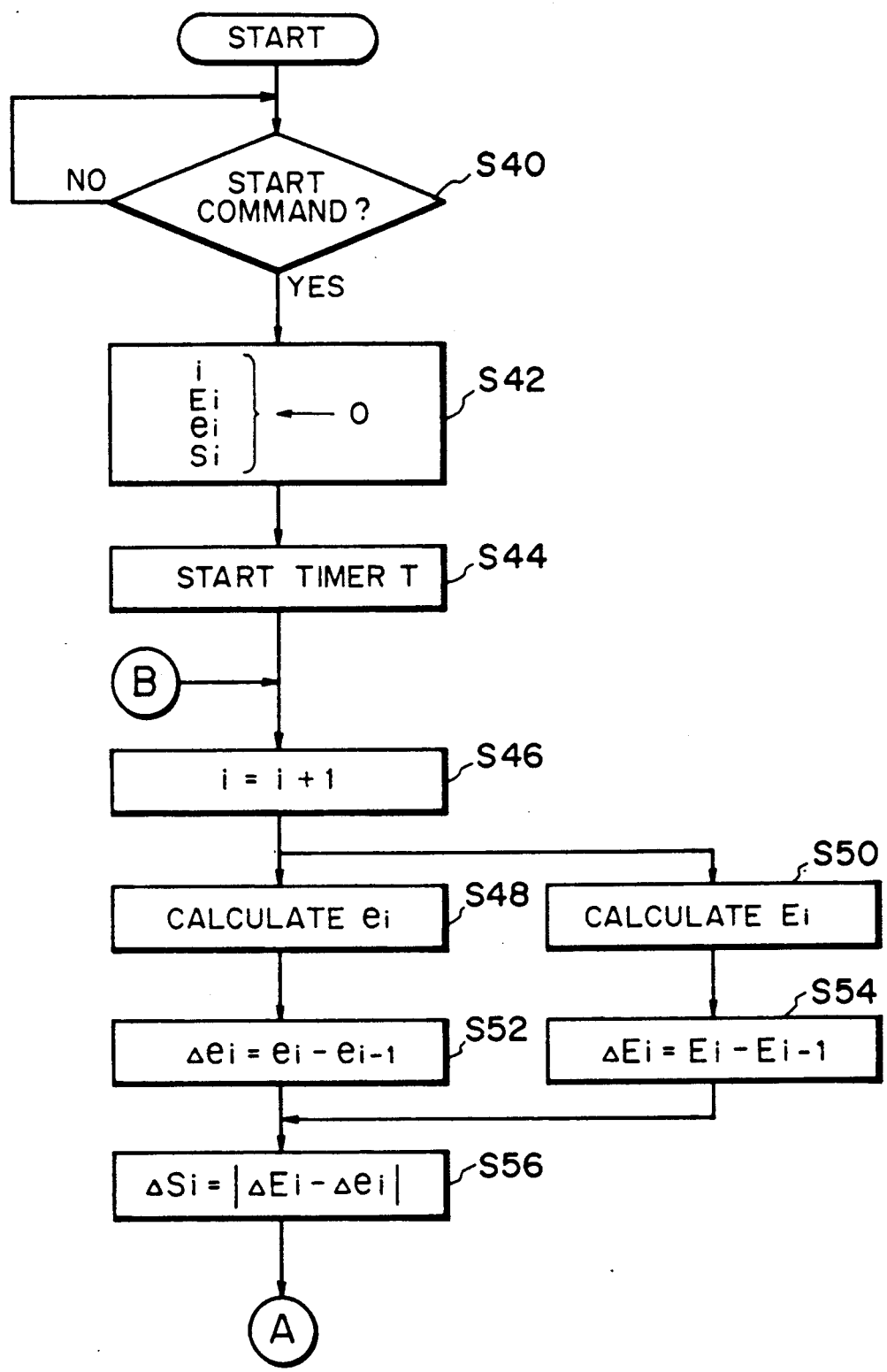
FIGS. 10A and 10B are flow charts for explaining a slip control operation by the control unit.
Figure 10B:
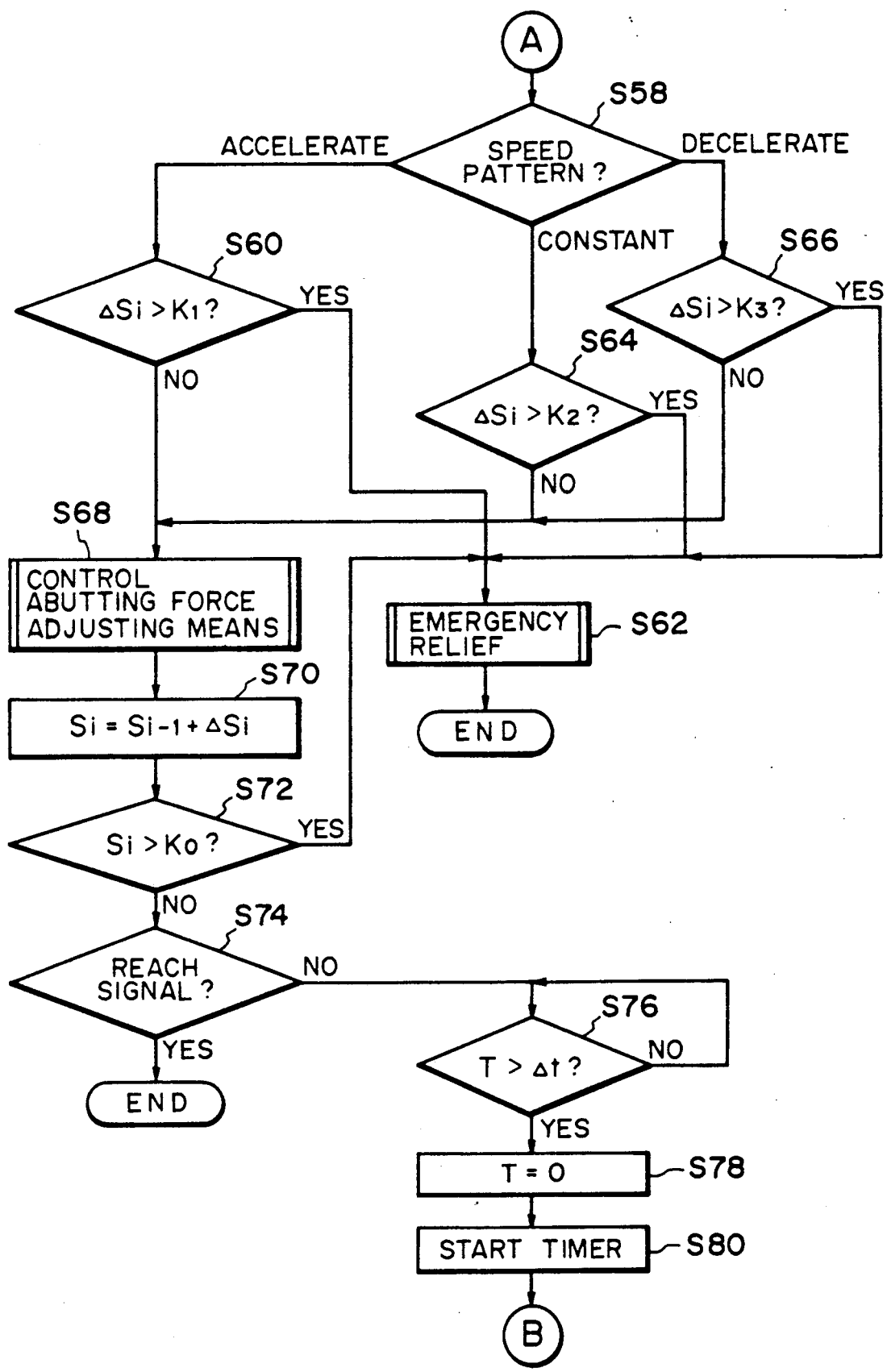

The slip control sequence performed by the control unit 46 will be described below with reference to flow-charts shown in FIGS. 10A and 10B.

First, if it is detected that a start command for the moving mechanism is generated from a control mechanism of the robot (not shown) in step S40, current values of the count i of the counter, the accumulated slip amount $S_1$, the actual moving amount $E_i$, and the logical moving amount $e_i$ are reset to be "0" in step S42. In step S44, a timer T for measuring a detection time unit $\Delta t$ in the slip control is started in synchronism with the driving signal output of the driving motor 40 in step S20 of the main moving control routine shown in FIG. 4. In step S46, the count i is incremented by one.

In steps S48 and S50, current theoretical and actual moving amounts $e_i$ and $E_i$ of the moving member 12 are calculated by the first and second rotary encoders 44 and 76, respectively. In steps S52 and S54, the theoretical and actual changing amounts $\Delta e_i$ and $\Delta E_i$ representing changing amounts per time unit $\Delta t$, respectively, by executing arithmetic operations of subtracting a value calculated at an immediately preceding timing (i−1).

Thereafter, in step S56, an absolute value of a difference between the changing amounts $\Delta E_i$ and $\Delta e_i$ per time unit on the basis of the results calculated in steps S52 and S54 is obtained to calculate the slip amount $S_i$ per time unit. In step S58, a current speed pattern of the moving member is judged. If the accelerate region is judged, it is judged in step S60 whether the slip amount $\Delta S_i$ per time unit is larger than the reference value $k_1$ for the accelerate region. If Y is judged in step S60, i.e., if the slip amount per time unit is larger than the reference value $k_1$ for the accelerate region, an emergency has occurred. Therefore, in step S62, the emergency relief operation is executed and the control operation is ended.

If the constant speed region is judged in step S58, it is judged in step S64 whether the slip amount $\Delta S_1$ per time unit is larger than the reference value $k_2$ for the constant speed region. If Y is judged in step S64, i.e., if the slip amount $\Delta S_1$ per time unit is larger than the reference value $k_2$ for the constant speed region, an emergency has occurred. Therefore, the emergency relief operation is executed in step S62. If the constant speed region is judged in step S58, it is judged in step S66 whether the slip amount $\Delta S_1$ per time unit is larger than the reference value $k_3$ for the decelerate region. If Y is judged in step S66, i.e., the slip amount $S_1$ per time unit is larger than the reference value $k_3$ for the decelerate region, an emergency has occurred. Therefore, the emergency relief operation is executed in step S62.

If N is determined in steps S60, S64, and S66, i.e., if the slip amount $\Delta S_1$ per time unit is smaller than the reference values $k_1$, $k_2$, and $k_3$ for the accelerate, constant speed, and decelerate regions, respectively, in step S68, the abutting force adjusting mechanism 58 is controlled on the basis of the slip amount $\Delta S_1$ to reduce the oil pressure $P_C$ from the oil pressure pump 60 in the direction of increasing the abutting forces $P_N$ and $P_S$ in the abutting force generating mechanism 50 and eliminating the slip.

Thereafter, in step S70, a current slip amount $\Delta S_i$ is added to the preceding accumulated slip amount $S_{i-1}$ to calculate a current accumulated slip amount $S_i$. In step S72, it is judged whether the accumulated slip amount $S_i$ is larger than the reference value $k_0$. If Y is judged in step S72, i.e., if the accumulated slip amount $S_i$ is larger than the reference value $k_0$, the flow skips to step S62 to execute the emergency relief operation.

If N is judged in step S72, i.e., if the accumulated slip amount $S_i$ is smaller than the reference value $k_0$, no emergency has occurred. Therefore, the flow advances to step S74, and it is judged whether a reach signal is output in step S28 in the main control routine described above. If Y in step S74, i.e., if the reach signal is output, the slip control routine is ended.

If N in step S74, i.e., if the reach signal has not output yet, the flow advances to step S76 to wait until the timer T reaches the detection time unit $\Delta t$. If the detection time unit $\Delta t$ is reached, the timer T is reset in step S78, and the timer T is started in step S80, and the flow returns to step S46.

In this case, since the slip control routine can be performed every time unit of about 5 msec in accordance with the robot control program, i.e., since the detection time unit $\Delta t$ is set to be 5 milliseconds, judgement can be correctly performed even if the maximum moving speed $V_{MAX}$ of the moving member 12 is 1,500 millimeters per second (mm/sec).

The present invention is not limited to the arrangement of the above embodiment but can be variously modified without departing from the spirit and scope of the invention.

For example, in the above embodiment, the angle defined by normals at the two rolling contact points A between the two driven wheels 24 and the driving shaft 34 is 120°. This angle, however can be changed within the range to be described below. That is, as described above with reference to the conventional techniques, the angle $\theta$ is defined within the range of:

$$60° < \theta < 180° \text{ C.}$$

provided that the diameter of each driven wheel 24 is set larger than at least the diameter of the driving shaft 34 in order to increase the contact length at the rolling contact portion and the diameter of the driving shaft 34 is set larger than a gap distance between the two driven wheels 24 in order to simultaneously bring the driving shaft 34 into rolling contact with the two driven wheels 24. In other words, the angle $\theta$ can be freely set within the above range.

In addition, this embodiment is applied to movement of one axis of an orthogonal robot. The present invention, however, can be applied to an NC machine tool, a shuttle, or the like.

Furthermore, in this embodiment, in order to detect the actual moving amount of the moving member 12, the rack member 72 and the pinion gear 74 to be meshed with the rack gear 72a of the rack member 72 are used, and the rotation amount of the pinion gear 74 is detected by the second rotary encoder 76. The present invention, however, is not limited to such calibration. For example, another means such as a linear encoder having a magnetic sensor or photosensor is used to detect the moving amount.

Moreover, a value obtained by integrating the accumulated value of the absolute values of the slip amounts is used as a value representing a degree of slip.

As has been described above in detail, the moving mechanism according to the present invention comprises a fixed base, a moving member movably provided with respect to the fixed base, a driving motor mounted on the moving member, a driving shaft rotatably supported by the moving member and rotated by the driving motor, a pair of driven wheels to be brought into rolling contact with the driving shaft, means for simultaneously bringing the driven wheels into rolling contact with the fixed base, and abutting means for causing the driving shaft to abut against the driven wheels so that they are fictionally engaged with each other, and causing the driven wheels to abut against the fixed base so that they are fictionally engaged with each other, wherein the driven wheels are rotated on the fixed base to move the moving member with respect to the fixed base in accordance with rotation of the driving shaft, the moving mechanism further comprising slip detecting means for detecting slip generated in a driving power transmitting system from the driving shaft to the fixed base, an abutting force adjusting means, connected to the abutting means, for adjusting the abutting force of the abutting means, and slip control means for adjusting the abutting force adjusting means in a direction of eliminating the slip on the basis of the detection result of the slip detecting means.

The moving mechanism according to the present invention is characterized in that the slip detecting means comprises first detecting means for detecting a theoretical moving amount, i.e., an amount by which the moving member theoretically moves on the basis of a rotation amount of the driving motor, second detecting means for detecting an actual moving amount of the moving member, and calculating means for calculating a slip amount on the basis of a difference between the detection results of the first and second detecting means.

The moving mechanism according to the present invention is characterized in that the first detecting means detects a changing amount of the theoretical moving amount per time unit, the second detecting means detects a changing amount of the actual moving amount per time unit, and the calculating means calculates an absolute value of a difference between the changing amounts of the theoretical moving amount and the actual moving amount per time unit.

The moving mechanism according to the present invention is characterized in that the slip control means comprises recognizing means for recognizing whether a moving state of the moving member is any of three moving states, i.e., an accelerate region, a constant speed region, and a decelerate region, and first judging means for judging on the basis of a reference value corresponding to each moving state whether a slip amount per time unit calculated by the calculating means is abnormal.

The moving mechanism according to the present invention is characterized in that the slip control means comprises emergency relieving means for relieving an abnormal state when the first judging means judges the abnormal state.

The moving mechanism according to the present invention is characterized in that the slip control means controls the abutting force adjusting means in accordance with the slip amount per time unit calculated by the calculating means.

The moving mechanism according to the present invention is characterized in that the slip control means comprises an accumulating means for accumulating the slip amount per time unit to calculate an accumulated slip amount.

The moving mechanism according to the present invention is characterized in that the slip control means comprises second judging means for judging whether the accumulated slip amount accumulated by the accumulating means is abnormal.

The moving mechanism according to the present invention is characterized in that the slip control means further comprises emergency relieving means for relieving an abnormal state when the second judging means judges the emergency.

The moving mechanism according to the present invention is characterized in that the means for simultaneously bringing the driven wheels into contact with the fixed base comprises a driven housing for rotatably supporting the driven wheels separated from each other, and a driving housing, fitted from the above in the driven housing, for rotatably supporting the driving shaft.

The moving mechanism according to the present invention is characterized in that the abutting means comprises an abutting housing located above the driving housing and fixed to the moving member, a first coil spring housed in the abutting housing and abutting against the driven housing to urge it downward so that the driven wheels are fictionally engaged with the fixed base, and a second coil spring housed parallel to the first coil spring in the abutting housing and abutting the driving housing to urge it downward so that the driving shaft is simultaneously fictionally engaged with the two driven wheels.

The moving mechanism according to the present invention is characterized in that a pair of guide rails are provided on the fixed base along a moving direction of the moving member, and sliding members are fitted in the guide rails so as to slide along the moving direction while the slide members are inhibited from being lifted therefrom, each sliding member being fixed to the moving member.

The moving mechanism according to the present invention is characterized in that the abutting force adjusting means comprises an oil pump, and oil cylinder means for applying an oil pressure from the oil pump in a direction opposite to a biasing direction of the first and second coil springs.

The moving mechanism according to the present invention is characterized in that the slip control means controls a driving amount of the oil pump to adjust the oil pressure therefrom, thereby controlling abutting forces of the two coil springs of the abutting means with respect to the driving housing and the driven housing.

The moving mechanism according to the present invention is characterized in that the oil cylinder means applies the oil pressure from the oil pump simultaneously to the first and second coil springs.

The moving mechanism according to the present invention is characterized in that the driving housing is fitted in the driven housing so as to lock movement along a direction perpendicular to the moving direction of the moving member.

The moving mechanism according to the present invention is characterized in that the abutting housing is fitted in the driven housing so as to lock movement along a direction perpendicular to the moving direction of the moving member.

The moving mechanism according to the present invention is characterized in that the diameter of the driving shaft is set smaller than the diameter of each driven wheels, and an angle $\theta$ defined by normals at two rotation contact positions between the driving shaft and the two driven wheels is set to fall within the range of $60° < \theta < 180°$.

According to the present invention, therefore, there is provided a moving mechanism capable of effectively suppressing slip when frictional engagement is used in a driving force transmitting system.

In addition, according to the present invention, there is provided a moving mechanism capable of moving an object to be moved at high speed or moving a heavy object while maintaining high positioning precision without increasing the size of the apparatus but decreasing the size of the apparatus to be smaller than conventional apparatuses.

Furthermore, according to the present invention, there is provided a moving mechanism capable of increasing the service life of the apparatus while maintaining high positioning precision.

Moreover, according to the present invention, there is provided a moving mechanism which can be easily assembled and adjusted and can be manufactured at low cost while maintaining high positioning precision.

What is claimed is:

1. A moving mechanism comprising:
   a fixed base;
   a moving member movably provided with respect to said fixed base;
   a driving motor mounted on said moving member;
   a driving shaft rotatably supported by said moving member and rotated by said driving motor;

a pair of driven wheels to be brought into rolling contact with said driving shaft;

means for simultaneously bringing said driven wheels into rolling contact with said fixed base; and abutting means for causing said driving shaft to abut against said driven wheels so that they are frictionally engaged with each other, and causing said driven wheels to abut against said fixed base so that they are frictionally engaged with each other.

2. An apparatus according to claim 1, wherein said means for simultaneously bringing said driven wheels into contact with said fixed base comprises:

a driven housing for rotatably supporting said driven wheels separated from each other; and a driving housing, fitted from above in said driven housing, for rotatably supporting said driving shaft.

3. An apparatus according to claim 2, wherein said abutting means comprises:

an abutting housing located above said driving housing and fixed to said moving member;

a first coil spring housed in said abutting housing and abutting against said driven housing to urge said driven housing downward so that said driven wheels are frictionally engaged with said fixed base; and a second coil spring housed parallel to said first coil spring in said abutting housing abutting against said driving housing to urge said driving housing downward so that said driving shaft is simultaneously frictionally engaged with said two driven wheels.

4. An apparatus according to claim 3, wherein a pair of guide rails are provided on said fixed base along a moving direction of said moving member, and sliding members are fitted in said guide rails so as to slide along said moving direction while slide members are inhibited from being lifted therefrom, each sliding member being fixed to said moving member.

5. An apparatus according to claim 3, further comprising abutting force adjusting means, wherein said abutting force adjusting means comprises:

an oil pump; and oil cylinder means for applying an oil pressure from said oil pump in a direction opposite to a biasing direction of said first and second coil springs, said oil cylinder means causing said oil pressure from said oil pump to simultaneously act on said first and second coil springs.

6. An apparatus according to claim 3, wherein said driving housing is fitted in said driven housing so as to lock movement along a direction perpendicular to said moving direction of said moving member.

7. An apparatus according to claim 1, wherein a diameter of said driving shaft is set smaller than a diameter of each of said driven wheels, and an angle $\theta$ defined by normals at two rotation contact positions between said driving shaft and said two driven wheels is set to fall within said range of $60° < \theta < 180°$.

8. A moving apparatus comprising:

a moving member;

driving means for driving said moving member, said driving means having a driving motor, a driving shaft, and a driven member to be abutted against said driving shaft;

abutting means for friction-engaging said driving shaft with said driven member;

slip detecting means for detecting slip produced in a driving force transmitting system of said driving shaft;

abutting force adjusting means, connected to said abutting means, for adjusting an abutting force of said abutting means; and slip control means for adjusting said abutting force adjusting means in a direction of eliminating the slip on the basis of a detection result of said slip detecting means.

9. An apparatus according to claim 8 wherein said slip detecting means comprises:

first detecting means for detecting a theoretical moving amount by which said moving member theoretically moves on the basis of a rotation amount of said driving motor;

second detecting means for detecting an actual moving amount of said moving member; and calculating means for calculating a slip amount on the basis of a difference between said detection results of said first and second detecting means.

10. An apparatus according to claim 9, wherein said first detecting means detects a changing amount of said theoretical moving amount per time unit, said second detecting means detects a changing amount of said actual moving amount per time unit, and said calculating means calculates an absolute value of a difference between said changing amounts of said theoretical moving amount and said actual moving amount per time unit.

11. An apparatus according to claim 10, wherein said slip control means comprises:

recognizing means for recognizing whether a moving state of said moving member is in one of either an accelerate state, a constant speed state, and a decelerate state; and first judging means for judging on the basis of a reference value corresponding to each moving state whether a slip amount per time unit calculated by said calculating means is emergent.

12. An apparatus according to claim 11, wherein said slip control means comprises emergency relieving means for relieving an emergent state when said first judging means judges said emergent state.

13. An apparatus according to claim 9, wherein said slip control means controls said abutting force adjusting means in accordance with said slip amount per time unit calculated by said calculating means.

14. An apparatus according to claim 9, wherein said slip control means comprises an accumulating means for accumulating said slip amount per time unit to calculate an accumulated slip amount.

15. An apparatus according to claim 14, wherein said slip control means comprises second judging means for judging whether said accumulated slip amount accumulated by said accumulating means is emergent.

16. An apparatus according to claim 15, wherein said slip control means further comprises emergency relieving means for relieving an emergent state when said second judging means judges said emergency.

* * * * *

UNITED STATES PATENT AND TRADEMARK OFFICE
CERTIFICATE OF CORRECTION

PATENT NO. : 5,040,427

DATED : August 20, 1991

INVENTOR(S) : Takeo Tanita, et al.

It is certified that error appears in the above-identified patent and that said Letters Patent is hereby corrected as shown below:

Title page:

[75] INVENTORS:

"Yasuhiro Sawada, Chufu," should read --Yasuhiro Sawada, Chofu,--.

[57] ABSTRACT:

Line 13, "fictionally" should read --frictionally--.

Line 20, "abuting" should read --abutting--.

COLUMN 6:

Line 55, "chambers" should read --cylinder chambers--.

COLUMN 16:

Line 46, "fictionally" should read --frictionally--.

Line 48, "fictionally" should read --frictionally--.

COLUMN 17:

Line 63, "fictionally" should read --frictionally--.

Line 67, "fictionally" should read --frictionally--.

UNITED STATES PATENT AND TRADEMARK OFFICE
CERTIFICATE OF CORRECTION

PATENT NO. : 5,040,427

DATED : August 20, 1991

INVENTOR(S) : Takeo Tanita, et al.

It is certified that error appears in the above-identified patent and that said Letters Patent is hereby corrected as shown below:

COLUMN 19:

Claim 4, line 37, "said" should read --the-- and "slide" should read --said slide--.

Signed and Sealed this

Thirteenth Day of April, 1993

Attest:

STEPHEN G. KUNIN

*Attesting Officer*          *Acting Commissioner of Patents and Trademarks*